(12) United States Patent
Tang et al.

(10) Patent No.: US 12,119,917 B2
(45) Date of Patent: Oct. 15, 2024

(54) SYSTEM AND METHOD FOR PROVIDING CHANNEL RECOVERY FOR ANGLE DOMAIN SPARSE CHANNELS

(71) Applicant: Samsung Electronics Co., Ltd., Gyeonggi-do (KR)

(72) Inventors: Yanru Tang, La Jolla, CA (US); Hongbing Cheng, San Diego, CA (US); Kee-Bong Song, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 17/989,332

(22) Filed: Nov. 17, 2022

(65) Prior Publication Data

US 2023/0077972 A1   Mar. 16, 2023

Related U.S. Application Data

(63) Continuation of application No. 16/736,224, filed on Jan. 7, 2020, now Pat. No. 11,539,424.
(Continued)

(51) Int. Cl.
  *H04B 7/08*    (2006.01)
  *H04B 7/0456*   (2017.01)
  *H04B 7/06*    (2006.01)

(52) U.S. Cl.
  CPC .......... *H04B 7/086* (2013.01); *H04B 7/0456* (2013.01); *H04B 7/0617* (2013.01); *H04B 7/0695* (2013.01)

(58) Field of Classification Search
  CPC .... H04B 7/086; H04B 7/0695; H04B 7/0617; H04B 7/0456
  See application file for complete search history.

(56) References Cited

U.S. PATENT DOCUMENTS

| 7,271,747 B2 * | 9/2007 | Baraniuk | H04N 19/60 341/87 |
| 7,511,643 B2 * | 3/2009 | Baraniuk | H03M 7/30 348/420.1 |

(Continued)

FOREIGN PATENT DOCUMENTS

| CN | 101719779 | 6/2010 |
| CN | 103188058 | 7/2013 |

(Continued)

OTHER PUBLICATIONS

Wikipedia, "Least squares", https://en.wikipedia.org/wiki/Least_squares, 2020, pp. 12.

(Continued)

*Primary Examiner* — Berhanu Tadese
(74) *Attorney, Agent, or Firm* — The Farrell Law Firm, P.C.

(57) ABSTRACT

A system and method are provided in which an input including a measurement output of digital channel information is received. The digital channel information includes an estimated digital channel, a beamforming codebook, and quantized angle of arrival (AoA) values. A basis corresponding to one of the quantized AoA values is selected according to a largest projection power of the measurement output. A partial channel is recovered based on the beamforming codebook and the estimated digital channel. An analog channel is recovered based on the partial channel and the basis.

12 Claims, 5 Drawing Sheets

Related U.S. Application Data

(60) Provisional application No. 62/892,166, filed on Aug. 27, 2019.

(56) References Cited

U.S. PATENT DOCUMENTS

| | | | | |
|---|---|---|---|---|
| 7,714,781 B2* | 5/2010 | Xia | ...................... | H01Q 3/2605 |
| | | | | 342/370 |
| 7,953,372 B2* | 5/2011 | Ofek | .................... | H04B 7/0491 |
| | | | | 455/67.14 |
| 7,977,943 B2* | 7/2011 | Marinelli | ........... | G01R 33/5611 |
| | | | | 324/309 |
| 8,384,515 B2* | 2/2013 | Rachlin | .................... | G07C 9/37 |
| | | | | 340/5.82 |
| 8,761,525 B2* | 6/2014 | Singh | ..................... | H04N 23/12 |
| | | | | 382/232 |
| 9,118,797 B2* | 8/2015 | Singh | ..................... | G06T 3/4015 |
| 9,122,932 B2* | 9/2015 | Bala | ........................ | G06V 20/52 |
| 9,178,590 B2* | 11/2015 | Kuo | ...................... | H04B 7/0478 |
| 9,293,130 B2* | 3/2016 | Amini | ..................... | G10L 15/02 |
| 9,559,417 B1* | 1/2017 | Schwarzwalder | ... | H01Q 3/2605 |
| 9,633,306 B2* | 4/2017 | Liu | ......................... | G06T 7/0012 |
| 9,867,192 B2* | 1/2018 | Krzymien | ............ | H04B 7/0639 |
| 9,948,769 B2* | 4/2018 | Emad | ...................... | H04M 3/34 |
| 10,050,695 B1* | 8/2018 | Tsai | .................... | H04B 7/0897 |
| 10,211,524 B2* | 2/2019 | Hozouri | ................ | H04W 72/542 |
| 10,250,309 B2* | 4/2019 | Truong | ............... | H04B 7/0469 |
| 10,270,509 B2* | 4/2019 | Liu | ...................... | H04B 7/0617 |
| 10,270,624 B2* | 4/2019 | Lee | ...................... | H04L 25/0256 |
| 10,339,235 B1* | 7/2019 | Ciarlini | .................. | G06F 30/20 |
| 10,439,994 B2* | 10/2019 | Rhyu | ................... | H04N 21/2347 |
| 10,484,207 B2* | 11/2019 | Lee | ..................... | H04L 25/0232 |
| 10,541,838 B2* | 1/2020 | Lee | ...................... | H04B 7/0413 |
| 10,680,684 B1* | 6/2020 | Cheng | ................... | H04B 7/043 |
| 10,705,176 B2* | 7/2020 | Mesecher | ................ | G01S 3/46 |
| 10,892,810 B2* | 1/2021 | Zhan | ..................... | H04B 7/088 |
| 10,898,125 B2* | 1/2021 | Givon | ..................... | G06N 3/04 |
| 10,958,318 B2* | 3/2021 | Hong | ................... | H04B 7/0617 |
| 11,005,541 B2 | 5/2021 | Lee et al. | | |
| 11,211,994 B2* | 12/2021 | Tang | .................... | H04L 25/025 |
| 11,374,796 B2* | 6/2022 | Tang | ................... | H04B 7/088 |
| 2004/0196813 A1* | 10/2004 | Ofek | ................... | H04B 7/0491 |
| | | | | 370/278 |
| 2004/0196834 A1* | 10/2004 | Ofek | ..................... | H01Q 1/246 |
| | | | | 370/352 |
| 2006/0094373 A1* | 5/2006 | Hottinen | ................ | H04B 7/066 |
| | | | | 455/562.1 |
| 2007/0027656 A1* | 2/2007 | Baraniuk | ................ | H03M 7/30 |
| | | | | 702/189 |
| 2008/0228446 A1* | 9/2008 | Baraniuk | ......... | G06F 18/21375 |
| | | | | 702/189 |
| 2009/0058724 A1* | 3/2009 | Xia | ...................... | H01Q 3/2605 |
| | | | | 342/368 |
| 2009/0239551 A1* | 9/2009 | Woodsum | ............... | H04B 7/26 |
| | | | | 342/377 |
| 2009/0256565 A1* | 10/2009 | Marinelli | ............. | G01R 33/561 |
| | | | | 324/309 |
| 2010/0066493 A1* | 3/2010 | Rachlin | ............... | G06V 10/7715 |
| | | | | 340/5.82 |
| 2011/0222448 A1* | 9/2011 | Ofek | ..................... | H01Q 1/246 |
| | | | | 370/310 |
| 2012/0087430 A1* | 4/2012 | Forenza | ............... | H04B 7/0626 |
| | | | | 375/267 |
| 2012/0259590 A1* | 10/2012 | Ye | ..................... | H03M 7/3062 |
| | | | | 702/189 |
| 2012/0314570 A1* | 12/2012 | Forenza | ............... | H04W 72/541 |
| | | | | 370/252 |
| 2013/0028341 A1* | 1/2013 | Ayach | ................... | H04B 7/0639 |
| | | | | 375/267 |
| 2013/0163645 A1* | 6/2013 | Kuo | ..................... | H04B 7/0663 |
| | | | | 375/267 |
| 2014/0036790 A1* | 2/2014 | Normando | ............. | H04B 15/00 |
| | | | | 370/329 |
| 2014/0314167 A1* | 10/2014 | Jeong | ................... | H04B 7/0617 |
| | | | | 375/267 |
| 2014/0341048 A1* | 11/2014 | Sajadieh | ............... | H04L 5/0053 |
| | | | | 370/252 |
| 2015/0030092 A1* | 1/2015 | Krishnamurthy | .... | H04B 7/0421 |
| | | | | 375/267 |
| 2015/0236774 A1* | 8/2015 | Son | ...................... | H04B 7/0639 |
| | | | | 375/267 |
| 2015/0256244 A1 | 9/2015 | Yu et al. | | |
| 2016/0072563 A1* | 3/2016 | Lee | ...................... | H04B 7/0619 |
| | | | | 375/267 |
| 2016/0142186 A1* | 5/2016 | Hong | ................... | H04B 7/0617 |
| | | | | 375/267 |
| 2016/0286037 A1* | 9/2016 | Emad | ...................... | H04M 3/34 |
| 2017/0012810 A1* | 1/2017 | Rakib | ................. | H04L 27/2697 |
| 2017/0019162 A1* | 1/2017 | Jeong | ................... | H04L 5/0057 |
| 2017/0099122 A1* | 4/2017 | Hadani | ................. | H04L 5/0005 |
| 2017/0102445 A1* | 4/2017 | Mesecher | ............... | G01S 3/325 |
| 2017/0104611 A1* | 4/2017 | Lee | ..................... | H04L 25/0256 |
| 2017/0141936 A1 | 5/2017 | Lee | | |
| 2017/0149594 A1* | 5/2017 | Rakib | .................. | H04L 5/0007 |
| 2017/0149595 A1* | 5/2017 | Rakib | ................. | H04B 7/0617 |
| 2017/0257230 A1 | 9/2017 | Son et al. | | |
| 2017/0288710 A1* | 10/2017 | Delfeld | ................. | H04L 5/0048 |
| 2017/0295001 A1* | 10/2017 | Chen | ..................... | H04L 5/0073 |
| 2017/0302341 A1* | 10/2017 | Yu | ...................... | H04B 7/0695 |
| 2018/0042028 A1 | 2/2018 | Nam et al. | | |
| 2018/0062722 A1 | 3/2018 | Su et al. | | |
| 2018/0122046 A1* | 5/2018 | Singh | ........................ | G06T 5/70 |
| 2018/0206274 A1* | 7/2018 | Cherian | ............... | H04B 7/0417 |
| 2018/0248596 A1 | 8/2018 | Xiao et al. | | |
| 2018/0309509 A1* | 10/2018 | Sheen | ..................... | H04W 4/08 |
| 2018/0310870 A1* | 11/2018 | Givon | ................... | G06T 7/0014 |
| 2019/0115963 A1* | 4/2019 | Zhu | ..................... | H04B 7/0626 |
| 2019/0123948 A1* | 4/2019 | Zhao | ................... | H04L 5/0048 |
| 2020/0162132 A1* | 5/2020 | Cheng | .................. | H04B 7/0456 |
| 2020/0287600 A1* | 9/2020 | Cheng | ..................... | H04B 7/043 |
| 2020/0358484 A1 | 11/2020 | Lee | | |
| 2020/0358512 A1* | 11/2020 | Zhan | ................... | H04B 7/0482 |
| 2020/0382346 A1* | 12/2020 | Noureddine | ............. | H04B 7/02 |
| 2021/0067232 A1* | 3/2021 | Tang | .................... | H04B 7/0456 |
| 2021/0167996 A1* | 6/2021 | Ratnam | ................ | H04B 7/0617 |
| 2021/0314056 A1* | 10/2021 | Tang | ................... | H04B 7/0695 |
| 2021/0328653 A1* | 10/2021 | Tang | .................... | H04B 7/086 |
| 2022/0094419 A1* | 3/2022 | Tang | ................... | H04B 7/0695 |

FOREIGN PATENT DOCUMENTS

| | | | | |
|---|---|---|---|---|
| CN | 106506112 | | 3/2017 | |
| CN | 106972907 | | 7/2017 | |
| CN | 106972907 A | * | 7/2017 | .......... H04B 7/0413 |
| CN | 107018099 | | 8/2017 | |
| CN | 107493123 | | 12/2017 | |
| CN | 107493123 A | * | 12/2017 | .......... H04B 7/0413 |
| CN | 107733481 | | 2/2018 | |
| CN | 107733481 A | * | 2/2018 | .......... H04B 7/0417 |
| CN | 108282206 | | 7/2018 | |
| CN | 108282206 A | * | 7/2018 | ............ H04B 7/024 |
| CN | 109005133 | | 12/2018 | |
| CN | 112019461 | | 12/2020 | |
| CN | 112019461 A | * | 12/2020 | |
| EP | 3 297 236 | | 3/2018 | |
| EP | 3297236 A1 | * | 3/2018 | .......... H04B 17/101 |
| KR | 10-2018-0077983 | | 7/2018 | |
| TW | 201328230 | | 7/2013 | |
| WO | WO 2008/083399 | | 7/2008 | |
| WO | WO 2016/008516 | | 1/2016 | |
| WO | WO-2016008516 A1 | * | 1/2016 | .......... H04B 7/0456 |
| WO | WO 2017/071618 | | 5/2017 | |
| WO | WO-2017071618 A1 | * | 5/2017 | ............. G01S 3/02 |
| WO | WO 2018/051900 | | 3/2018 | |
| WO | WO-2018051900 A1 | * | 3/2018 | .......... H04B 17/101 |
| WO | WO 2018/136254 | | 7/2018 | |
| WO | WO-2018136254 A1 | * | 7/2018 | ............ H04B 7/024 |

(56) References Cited

FOREIGN PATENT DOCUMENTS

| WO | WO 2018/179557 | 10/2018 |
| WO | WO 2019/103454 | 5/2019 |

OTHER PUBLICATIONS

Z. Zhang, Y. Xu, J. Yang, X, Li, and D. Zhang, "A survey of sparse representation: Algorithms and applications," IEEE Access, vol. 3, pp. 490-530, May 2015.

S.G. Mallat and Z. Zhang, "Matching pursuits with time-frequency dictionaries," IEEE Trans. Signal Process., vol. 41, No. 12, pp. 3397-3415, Dec. 1993.

Y.C. Pati et al., "Orthogonal matching pursuit: Recursive function approximation with applications to wavelet decomposition," in Proc. 27th Annu. Asilomar Conf. Signals, Systems, and Computers, Pacific Grove, CA, Nov. 1993, vol. 1, pp. 40-44.

D. Needell and J. A. Tropp, "CoSaMP: Iterative signal recovery from incomplete and inaccurate samples,"Appl. Comput. Anal., vol. 26, No. 3, pp. 301-321, 2009.

W. Dai and O. Milenkovic, "Subspace pursuit for compressive sensing signal reconstruction," IEEE Trans. Inf. Theory, vol. 55, No. 5, pp. 2230-2249, (2009).

Chen, S., Donoho, D.L., and Saunders, M.A. (1999) Atomic Decomposition by Basis Pursuit. Siam J. Sci Comp., 20, 1, 33-61.

M. Figueiredo, R. Nowak, and S. Wright, "Gradient projection for sparse reconstruction; Application to compressed sensing and other inverse problems," IEEE J. Select Topics Signal Process., 2007, pp. 12.

A. Fletcher and S. Rangan. Orthogonal matching pursuit from noisy random measurements: A new analysis. In Y. Bengio, D. Schuurmans, J. Lafferty, C. K. I. Williams, and A. Culotta, editors, Advances in Neural Information Processing Systems 22, pp. 540-548. 2009.

M. Aharon et al., "K-SVD: an algorithm for designing overcomplete dictionaries for sparse representation," IEEE Transactions on Signal Processing, vol. 54, No. 11, pp. 4311-4322, Nov. 2006.

J. A. Tropp, A. C. Gilbert, and M. J. Strauss, "Algorithms for simultaneous sparse approximation. Part I: Greedy pursuit," Signal Processing, vol. 86, pp. 572-588, Apr. 2006.

K. Rosenblum, L. Zelnik-Manor, and Y. C. Eldar. (Sep. 2010) Sensing matrix optimization for block-sparse decoding. arXiv:1009.1533v1, pp. 10.

G. Li et al., "On projection matrix optimization for compressive sensing systems," IEEE Trans. Signal Process., vol. 61, No. 11, pp. 2887-2898, Jun. 2013.

J. Lee, G.-T. Gil, and Y. H. Lee, "Channel estimation via orthogonal matching pursuit for hybrid MIMO systems in millimeter wave communications," IEEE Transactions on Communications, vol. 64, No. 6, pp. 2370-2386, Jun. 2016.

Y. Chi and R. Calderbank, "Knowledge-enhanced matching pursuit," In Proc. IEEE Int. Conf. Acoust., Speech, Signal Process., Vancouver, BC, Canada, May 2013, pp. 6576-6580.

C. Ekanadham, D. Tranchina, and E. P. Simoncelli, "Recovery of sparse translation-invariant signals with continuous basis pursuit," IEEE Trans. Signal Process., vol. 59, No. 10, pp. 4735-4744, Oct. 2011.

Wipf. D. P., and Rao, B. D. An empirical Bayesian strategy for solving the simultaneous sparse approximation problem. IEEE Transactions on Signal Processing, vol. 55, No. 7 (2007), pp. 3704-3716.

S. Narayanan, S. K. Sahoo and A. Makur, "Greedy pursuits assisted basis pursuit for compressive sensing," 2015 23rd European Signal Processing Conference (EUSIPCO), 2015, pp. 694-698, doi: 10.1109/EUSIPCO.2015.7362472. (Year: 2015).

KR Notice of Allowance dated Jul. 3, 2023 issued in counterpart application No. 10-2020-0039053, 7 pages.

Taiwanese Office Action dated Oct. 25, 2023 issued in counterpart application No. 109117648, 11 pages.

Kai Liu et al., "Structured Sparse and Low Rank Channel Estimation in Uplink 3D-MIMO", Journal of Electronics & Information Technology, vol. 40, No. 1, Jan. 2018, 7 pages.

Chinese Office Action dated Apr. 7, 2024 issued in counterpart application No. 202010549824.X, 10 pages.

\* cited by examiner

SYSTEM AND METHOD FOR PROVIDING CHANNEL RECOVERY FOR ANGLE DOMAIN SPARSE CHANNELS

PRIORITY

This application is a Continuation application of U.S. patent application Ser. No. 16/736,224, filed in the U.S. Patent and Trademark Office (USPTO) on Jan. 7, 2020, which is based on and claims priority under 35 U.S.C. § 119(e) to U.S. Provisional Patent Application No. 62/892,166, filed in the USPTO on Aug. 27, 2019, the entire contents of which are incorporated herein by reference.

FIELD

The present disclosure generally relates to a wireless communication system. In particular, the present disclosure relates to a system and method for providing channel recovery for angle domain sparse channels.

BACKGROUND

The 3$^{rd}$ Generation Partnership Project (3GPP) 5$^{th}$ generation (5G) standard includes multi-user multiple-input multiple-output (MU-MIMO) communication systems. In a MU-MIMO communication system, a base station transmits multiple data streams, one per user equipment (UE), using the same time-frequency resources to increase cell capacity. Beamforming is used in MIMO systems based on multiple antennas to control the antenna signal direction. Beamforming includes analog beamforming, digital beamforming, and hybrid beamforming.

SUMMARY

According to one embodiment, a method includes receiving an input including a measurement output and recovering analog channels utilizing bases derived from the measurement output.

According to one embodiment, a system includes a memory and a processor configured to receive an input including a measurement output and recover analog channels utilizing bases derived from the measurement output.

According to one embodiment, a method is provided in which an input including a measurement output of digital channel information is received. The digital channel information includes an estimated digital channel, a beamforming codebook, and quantized angle of arrival (AoA) values. A basis corresponding to one of the quantized AoA values is selected according to a largest projection power of the measurement output. A partial channel is recovered based on the beamforming codebook and the estimated digital channel. An analog channel is recovered based on the partial channel and the basis.

According to one embodiment, a system is provided having a memory and a processor. The processor is configured to receive an input including a measurement output of digital channel information. The digital channel information includes an estimated digital channel, a beamforming codebook, and quantized AoA values. A basis corresponding to one of the quantized AoA values is selected according to a largest projection power of the measurement output. A partial channel is recovered based on the beamforming codebook and the estimated digital channel. An analog channel is recovered based on the partial channel and the basis.

According to one embodiment, a non-transitory computer readable storage medium is provided, which when executed causes a processor to receive an input including a measurement output of digital channel information. The digital channel information includes an estimated digital channel, a beamforming codebook, and quantized AoA values. The instructions also cause the processor to select a basis corresponding to one of the quantized AoA values according to a largest projection power of the measurement output, recover a partial channel based on the beamforming codebook and the estimated digital channel, and recover an analog channel based on the partial channel and the basis.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
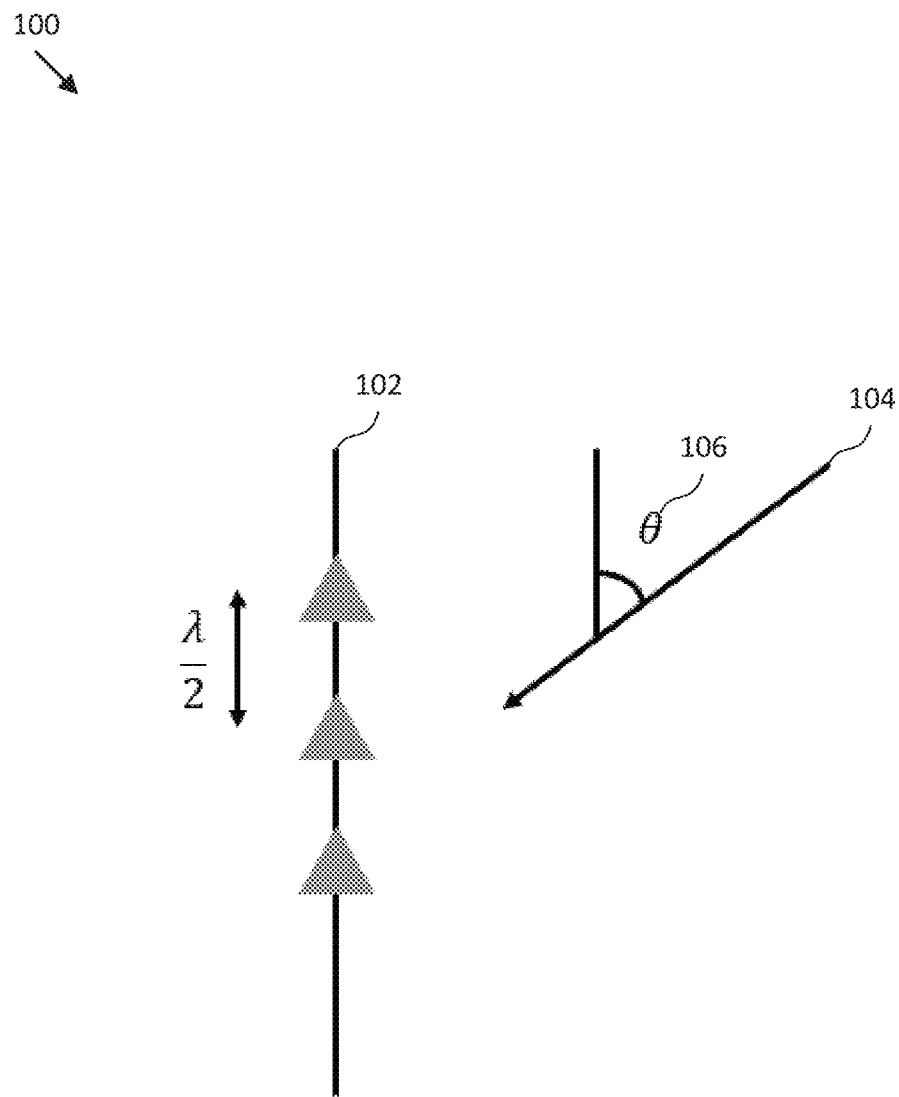
FIG. 1 illustrates a diagram of a one-dimensional antenna array and an AoA being defined, according to one embodiment.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "1$^{st}$," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

Analog beamforming adjusts the signal phases of individual antennas signals in a radio frequency (RF) domain. In digital beamforming, the signal is pre-coded in baseband processing before RF transmission.

In hybrid beamforming with single-connection antenna arrays, analog antennas are separated into several groups and each group is combined independently into a separated RF chain. In a single RF chain, for the receiver analog beamforming, a beam sweeping process is performed periodically to update the optimal beamforming vector. During the beam sweeping process, the receiver uses M different beamforming vectors, denoted by $w_i \in \mathcal{C}^{1 \times N_R}$ for i=1, ..., M, chosen from a designed codebook to combine analog signals received from $N_R$ antennas. Given combined signals, the receiver performs digital channel estimation. With $Y \in \mathcal{C}^{M \times K}$ as the estimated digital channels and $H=[h_1, \ldots, h_K] \in \mathcal{C}^{N_R \times K}$ as the actual analog channels, Y is modeled as in Equation (1):

$$Y = WH + N \tag{1}$$

where $$W = \begin{bmatrix} w_1 \\ \vdots \\ w_M \end{bmatrix} \in \mathcal{C}^{M \times N_R}$$

is the beamforming codebook and $N \in \mathcal{C}^{M \times K}$ is the digital channel estimation error. As described herein, $$N = \begin{bmatrix} n_1 \\ \vdots \\ n_M \end{bmatrix}$$

and it is assumed that $n_m^T \sim \mathcal{C}\mathcal{N}(0, \sigma^2 I)$, for m=1, ..., M, and that it satisfies Equation (2):

$$E[n_j^H n_k] = 0, \text{for } 1 \leq j,k \leq M \text{ and } j \neq k \tag{2}$$

Given Y and W, the receiver recovers the analog channel H. Based on the recovered analog channels, the receiver derives the optimal beamforming vector using the Eigen-based single-connection analog beamforming (ESAB) algorithm to improve hybrid beamforming gain, as described in U.S. patent application Ser. No. 16/256,328 entitled "System and Method for Analog Beamforming for Single-Connected Antenna Array," the entire content of which is incorporated by reference herein. With $f_k$ being the frequency of the kth subcarrier, for k=1, ..., K, channel $h_k$ is modelled by Equation (3):

$$h_k = \sum_{l=1}^{L} \sum_{i=1}^{R_l} \alpha_{li} e^{j\phi_{li}} e^{-j2\pi f_k \tau_{li}} a(\theta_{li}) \tag{3}$$

The channel model in Equation (3) assumes that the channel at the kth subcarrier has L clusters and that the lth cluster contains $R_l$ rays. Each ray is modelled using parameters angle of arrival (AoA) $\theta_{li}$, path gain $\alpha_{li}$, phase shift $\phi_{li}$, and delay $\tau_{li}$. Under the assumption of uniform linear array (ULA) with distance of half the wavelength, given $\theta$, $\alpha(\theta) \in \mathcal{C}^{N_R}$ is given by Equation (4):

$$\alpha(\theta) = [e^{j\pi*0*\cos\theta}, \ldots, e^{j\pi*(N_R-1)*\cos\theta}]^T \tag{4}$$

FIG. 1 illustrates a diagram 100 of a one-dimensional antenna array and an AoA being defined. FIG. 1 shows a one-dimensional antenna array 102 receiving a signal 104 having an AoA 106.

For $\overline{\Theta}=\{\overline{\theta}_1,\ldots,\overline{\theta}_N\}$ as a set of quantized values for AoAs, and the matrix $A \in \mathcal{C}^{N_R \times N}$ is defined as Equation (5):

$$A=[\alpha(\overline{\theta}_1), \ldots, \alpha(\overline{\theta}_N)], \quad (5)$$

For n=1, ..., N, the $\overline{\theta}_n$ are defined as Equation (6):

$$\overline{x}_n = \pi \cos(\overline{\theta}_n) = \pi\left(-1 + \frac{2}{N}(n-1)\right) \quad (6)$$

Under the assumption that the channel is sparse in the angle domain, if the AoA is quantized finely enough, then it is possible to approximate H by H≈AS for some coefficient matrix $S=[s_1, \ldots, s_K] \in \mathcal{C}^{N \times K}$ satisfying Equation (7):

$$\|S\|_0 \leq \overline{L} \text{ with } \overline{L} < < N \quad (7)$$

where $\|S\|_0$ is the number of nonzero rows of S and $\overline{L}$ is some known parameter that determines the number of angles involved in channel approximation. Given $\overline{L}$, the maximum likelihood (ML) estimator for H can be derived from Equation (8):

$$\min_S \|y - \Phi S\|_F; \text{ s.t. } \|S\|_0 \leq \overline{L} \quad (8)$$

where, as in Equation (9):

$$\Phi=[\varphi(\overline{x}_1), \ldots, \varphi(\overline{x}_N)]=WA, \varphi(\overline{x}_i)=W\alpha(\overline{x}_i), \text{ for } i=1, \ldots, N \quad (9)$$

Under the $l_0$ constraint, it is possible to approximate the channel using no more than $\overline{L}$ angles chosen from the quantized set. With S* being the solution to the above optimization problem, the channel H can be estimated as in Equation (10):

$$\hat{H}=AS^* \quad (10)$$

According to one embodiment, the present system and method includes using an partial identity codebook in a general case or uniform discrete Fourier transform (DFT) codebook if $N_R$ is integer multiples of M. The partial identity codebook includes the first M rows of an identity matrix of size $N_R \times N_R$. Under such codebooks, the present system and method includes a closed-form simultaneous orthogonal matching pursuit (SOMP) method to reduce complexity.

Figure 2:
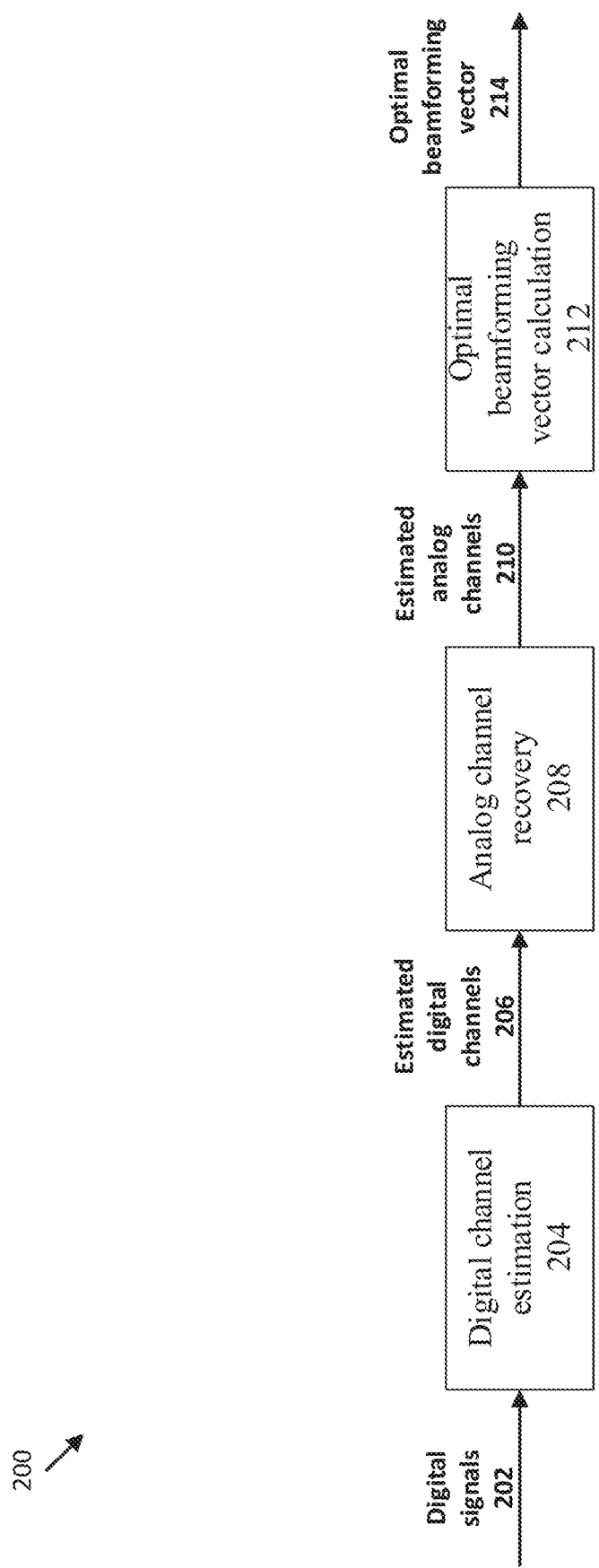
FIG. 2 illustrates a block diagram for the present receiver, where analog beamforming is performed, according to one embodiment.

FIG. 2 illustrates a block diagram 200 of a process where analog beamforming is performed, according to one embodiment. The system performs the beam sweeping process periodically to update its analog beam. Given the digital signals 202, the system performs digital channel estimation at 204 followed by analog channel recovery at 208 based on the estimated digital channels 206. Based on the estimated analog channels 210, the system generates the optimal beamforming vector at 212 using the Eigen-based single-connection analog beamforming (ESAB) algorithm to improve hybrid beamforming gain, and produces the optimal beamforming vector 214.

Figure 3:
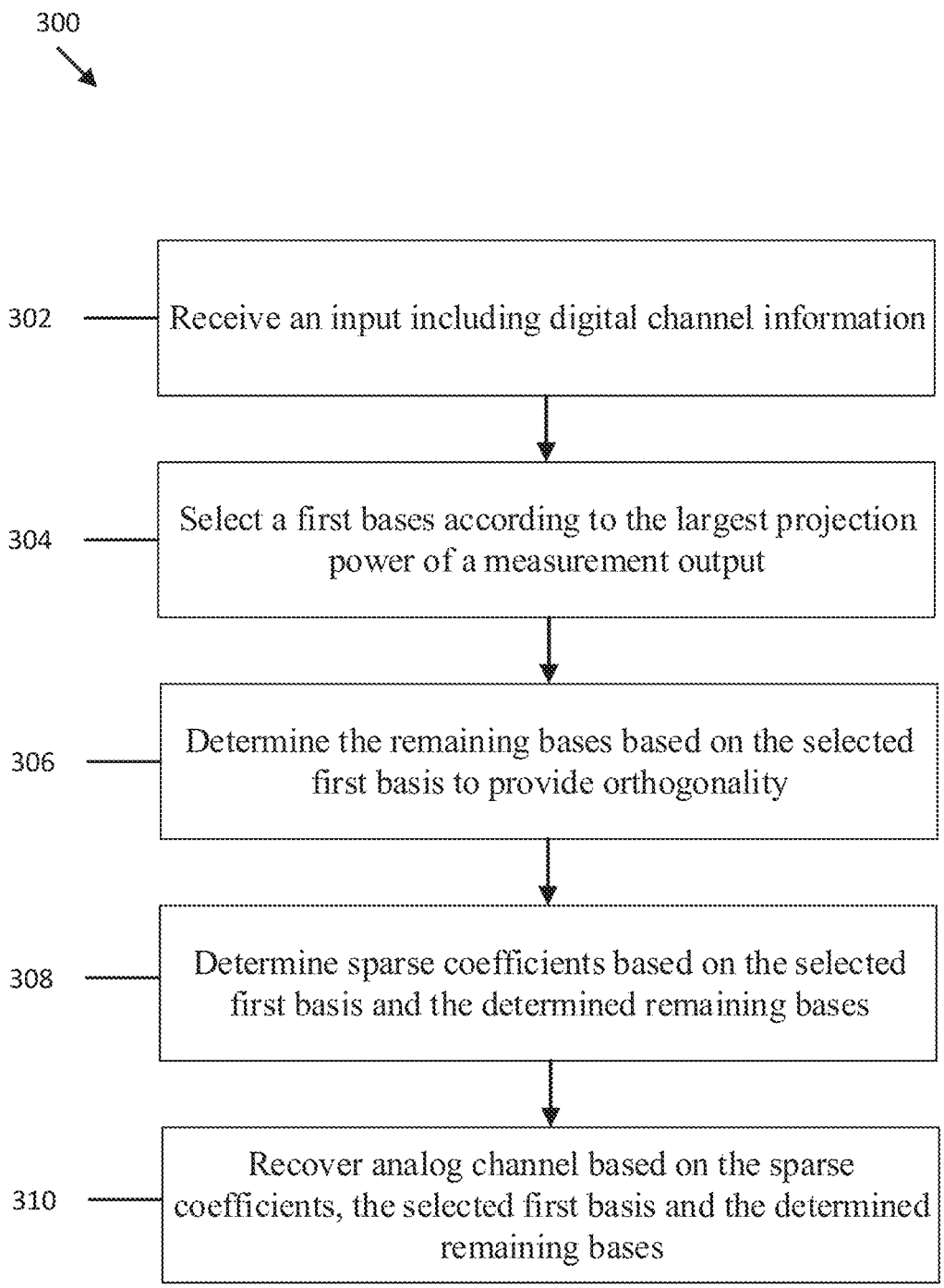
FIG. 3 illustrates a flowchart in a method for analog channel recovery, according to an embodiment.

FIG. 3 illustrates a flowchart in a method for analog channel recovery, according to an embodiment. At 302, the system receives an input including digital channel information. The input may include estimated digital channel $Y=[y_1, \ldots, y_K] \in \mathcal{C}^{M \times K}$, a codebook $W \in \mathcal{C}^{M \times N_R}$ and quantized values $\{\overline{x}_1, \ldots, \overline{x}_N\}$.

At 304, the system selects a first basis according to the largest projection power of the measurement output. If M>2, the system selects the first basis $\varphi(x_1^*)$ according to Equation (11):

$$x_1^* = \underset{x \in \{\overline{x}_1, \ldots, \overline{x}_N\}}{\text{argmax}} \frac{\varphi(x)^H YY^H \varphi(x)}{\|\varphi(x)\|^2}. \quad (11)$$

If M=2, the system selects the first basis $\varphi(x_1^*)$ according to Equation (12):

$$x_1^* = \underset{x}{\text{argmax}} \text{Re}\{y_2 y_1^H e^{-jx}\} = \angle(y_2 y_1^H) \quad (12)$$

where $y_1$ and $y_2$ are the first and second row of Y.

At 306, the system determines the remaining bases based on the selected first basis to provide orthogonality. The system may determine the remaining bases $\varphi(x_i^*)$ as in Equation (13):

$$x_i^* = x_1^* + \frac{2\pi}{M}(i-1), i = 2, \ldots, M \quad (13)$$

At 308, the system determines the sparse coefficients based the selected first basis and the determined remaining bases. The sparse coefficients $\tilde{S}$ may be determined as in Equation (14):

$$\tilde{S} = \frac{1}{\|\varphi(x_1^*)\|^2} \Phi_X^H Y \quad (14)$$

where, as in Equation (15):

$$\Phi_X = [\varphi(x_1^*), \ldots, \varphi(x_M^*)] \in \mathcal{C}^{M \times M} \quad (15)$$

At 310, the system recovers the analog channel based on the sparse coefficients, the selected first basis, and the determined remaining bases. The estimated channel on K subcarriers is given by Equation (16):

$$\hat{H}=[\hat{h}_1, \ldots, \hat{h}_K]=[a(x_1^*), \ldots, a(x_M^*)]\tilde{S} \quad (16)$$

In one embodiment, the present method is used to find a sparse solution to the optimization problem, where Y and $\Phi$ are given as in Equation (8).

In one embodiment, the present system and method are applicable to a beamforming codebook W that ensures a set of mutually orthogonal bases.

It holds that if beamforming codebook W satisfies Equation (17):

$$W = [W_1 \ldots W_J] \in \mathcal{C}^{M \times N_R}, W_i \in \mathcal{C}^{M \times M}, i=1, \ldots, J = \frac{N_R}{M}$$

$W_1 W_1^H = I_{M \times M}$ and $W_j = C_j W_1$ for some constant $$C_j, j=1, \ldots, J = \frac{N_R}{M} \quad (17)$$

the partial identify codebook for any $M < N_R$ satisfies the above condition. A uniform DFT codebook with $$\frac{N_R}{M}$$

being the integer satisfies the above condition as well.

Given Equation (18):

$$Y = [\varphi(x_1^*), \ldots, \varphi(x_M^*)] \begin{bmatrix} s_1 \\ \vdots \\ s_M \end{bmatrix} \quad (18)$$

The present system may select $\overline{M}$ bases with $\overline{M} < M$ from $\{\varphi(x_1^*), \ldots, \varphi(x_M^*)\}$ by choosing those with $\overline{M}$ largest $\|s_i\|^2$. With $i_1, \ldots, i_{\overline{M}}$ as selected indexes and $\Phi_{\overline{M}} = [\varphi(x_{i_1}^*), \ldots, \varphi(x_{i_{\overline{M}}}^*)]$, the estimated channel is given by Equation (19):

$$\hat{H} = [a(x_{i_1}^*), \ldots, a(x_{i_{\overline{M}}}^*)] \tilde{S} \quad (19)$$

where, as in Equation (20):

$$\tilde{S} = (\Phi_{\overline{M}}^H \Phi_{\overline{M}})^{-1} \Phi_{\overline{M}}^H Y \quad (20)$$

According to one embodiment, the present system and method for providing channel recovery for angle-domain sparse channels include receiving parameters including a measurement output and a beamforming codebook, selecting a first basis according to a largest projection power of the measurement output onto a set of bases, where each basis in the set corresponds to one quantized AoA value, generating the other remaining bases to ensure/enable orthogonality, determining sparse coefficients based on all selected bases, and recovering an analog channel based on the sparse coefficients and all selected bases.

The present system and method may be utilized with an partial identity codebook (i.e., first M rows of an identity matrix) and a uniform DFT codebook with an arbitrary offset $x_1$, as in Equation (21):

$$W_{DFT} = \begin{bmatrix} a^H(x_1) \\ \vdots \\ a^H(x_M) \end{bmatrix}, x_i = x_1 + \frac{2\pi}{M}(i-1), i = 2, \ldots, M, \forall x_1 \quad (21)$$

Figure 4:
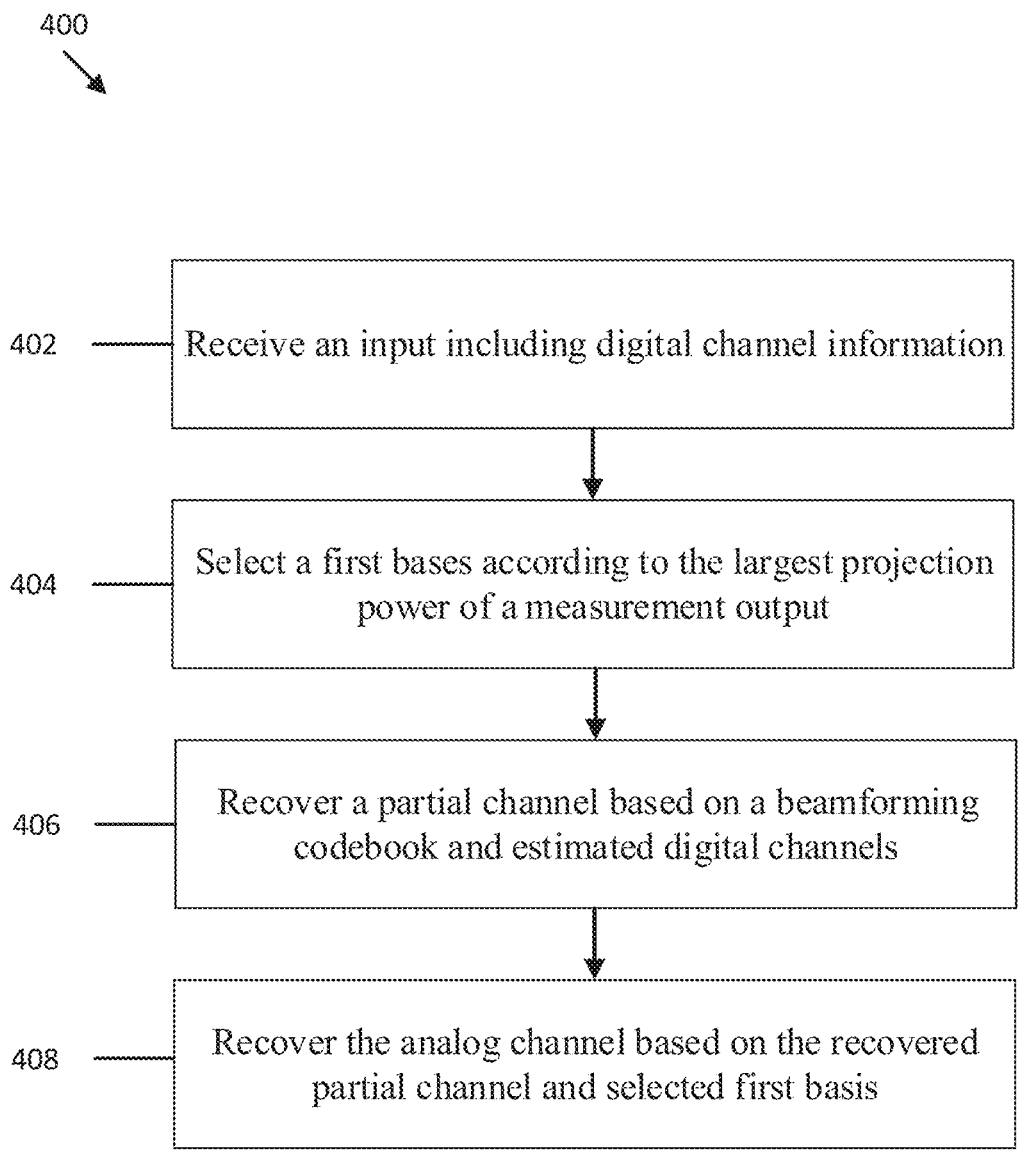
FIG. 4 illustrates a flowchart in a method for analog channel recovery, according to an embodiment.

FIG. 4 illustrates a flowchart 400 in a method for analog channel recovery, according to an embodiment. At 402, the system receives an input including digital channel information. The input may include estimated digital channel $Y = [y_1, \ldots, y_K] \in \mathcal{C}^{M \times K}$, a codebook $W \in \mathcal{C}^{M \times N_R}$ and quantized AoA values $\{\bar{x}_1, \ldots, \bar{x}_n\}$.

At 404, the system selects a first basis according to the largest projection power of a measurement output. With $\hat{H}$ as an estimate derived from the closed form SOMP algorithm. Given $\tilde{x}_i$, $i=1, \ldots, M$, satisfying Equation (22):

$$\tilde{x}_i = \tilde{x}_1 + \frac{2\pi}{M}(i-1), i = 2, \ldots, M \quad (22)$$

$\hat{H}$ can be written as Equation (23) and (24).

$$\hat{H} = \begin{bmatrix} \hat{H}_1 \\ \vdots \\ \hat{H}_J \end{bmatrix}, \hat{H}_i \in \mathcal{C}^{M \times K}, i = 1, \ldots, J = \frac{N_R}{M} \quad (23)$$

$$\hat{H}_i = e^{jM(i-1)\tilde{x}_1} \hat{H}_1, i = 1, \ldots, J = \frac{N_R}{M} \quad (24)$$

The dominant AoA $\tilde{x}_1$ is given by Equation (25).

$$\tilde{x}_1 = \underset{x \in \{\bar{x}_1, \ldots, \bar{x}_N\}}{\mathrm{argmax}} \frac{\varphi(x)^H Y Y^H \varphi(x)}{\|\varphi(x)\|^2}, \quad (25)$$

At 406, the system recovers a partial channel based on a beamforming codebook and estimated digital channels. To derive $\hat{H}$, it is sufficient to know $\hat{H}_1 \in \mathcal{C}^{M \times K}$. To derive $\hat{H}_1$, there is no need to explicitly calculate sparse coefficients $\tilde{S}$ for both IDT and uniform DFT codebooks. Given W, Y and $\tilde{x}_1, \ldots, \tilde{x}_M$, $\hat{S}$ is calculated from Equation (26).

$$\tilde{S} = (W[a(\tilde{x}_1), \ldots, a(\tilde{x}_M)])^H Y \quad (26)$$

$\hat{H}_i$ is estimated by Equation (27).

$$\hat{H}_1 = [a_1(\tilde{x}_1), \ldots, a_1(\tilde{x}_M)] \tilde{S} \quad (27)$$

For the IDT codebook, $W_i = 0_{M \times M}$, for $i \geq 2$. Therefore, if W satisfies the condition of Equation (17), Equation (28) can be derived.

$$\hat{H}_1 = M \sum_{i=1}^{J} e^{-jM(i-1)\tilde{x}_1} C_j^* W_1^H Y \quad (28)$$

Since scaling parameters do not affect the analog beamforming performance, they can be ignored. Thus, the partial channel is given as Equation (29).

$$\hat{H}_1 = W_1^H Y \quad (29)$$

At 408, the system recovers the analog channel based on the recovered partial channel and the selected first basis. The analog channel can be given as Equation (30).

$$\hat{H} = \begin{bmatrix} \hat{H}_1 \\ \vdots \\ \hat{H}_J \end{bmatrix}, \hat{H}_i = e^{jM(i-1)\tilde{x}_1} \hat{H}_1, i = 1, \ldots, J = \frac{N_R}{M} \quad (30)$$

Figure 5:
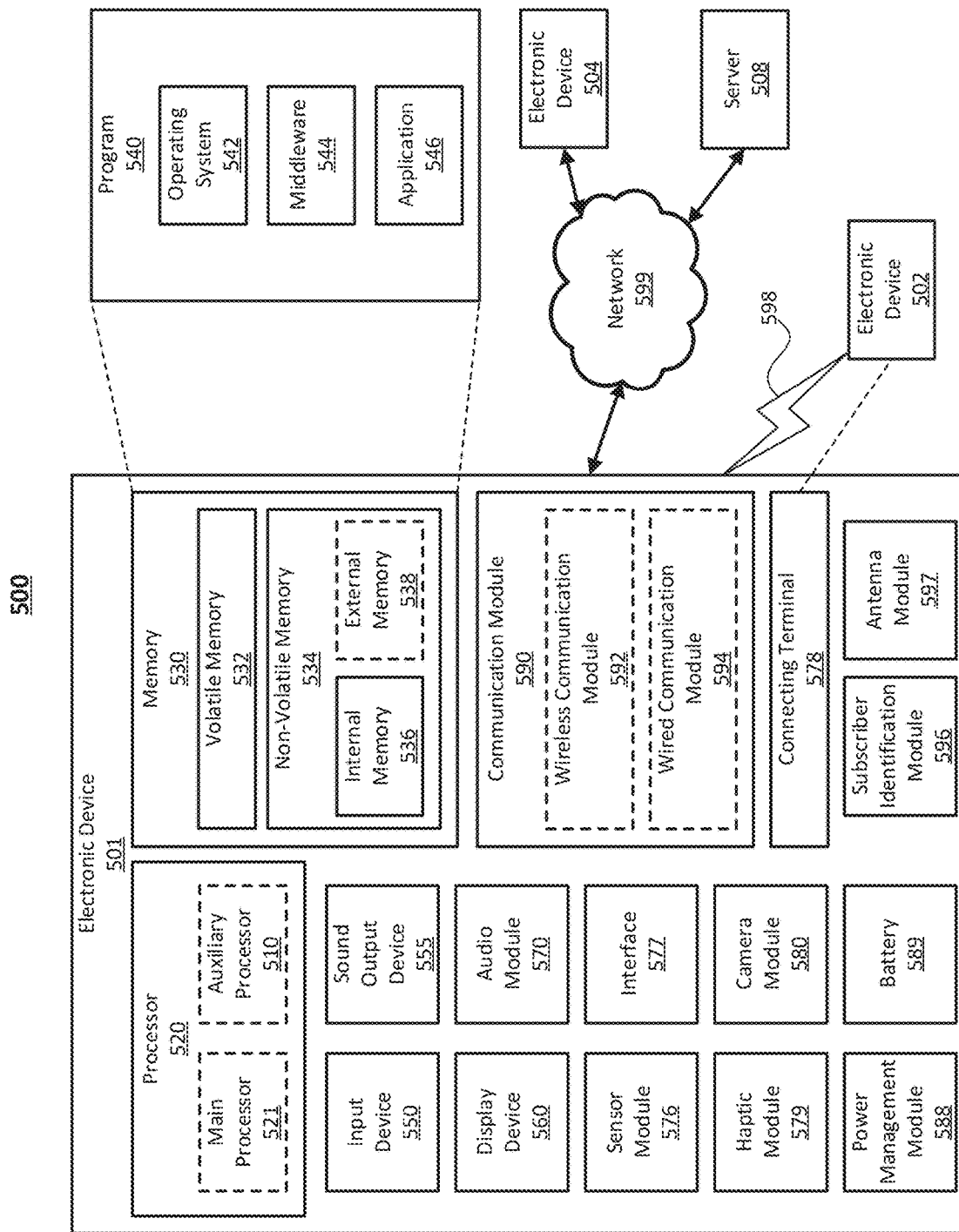
FIG. 5 illustrates a block diagram of an electronic device in a network environment, according to one embodiment.

FIG. 5 illustrates a block diagram of an electronic device 501 in a network environment 500, according to one embodiment. Referring to FIG. 5, the electronic device 501 in the network environment 500 may communicate with another electronic device 502 via a first network 598 (e.g., a short-range wireless communication network), or another electronic device 504 or a server 508 via a second network 599 (e.g., a long-range wireless communication network). The electronic device 501 may also communicate with the electronic device 504 via the server 508. The electronic device 501 may include a processor 520, a memory 530, an input device 550, a sound output device 555, a display device 560, an audio module 570, a sensor module 576, an interface 577, a haptic module 579, a camera module 580, a power management module 588, a battery 589, a communication module 590, a subscriber identification module (SIM) 596, or an antenna module 597. In one embodiment, at least one (e.g., the display device 560 or the camera module 580) of the components may be omitted from the electronic device 501, or one or more other components may be added to the electronic device 501. In one embodiment, some of the components may be implemented as a single integrated circuit (IC). For example, the sensor module 576 (e.g., a fingerprint sensor, an iris sensor, or an illuminance sensor) may be embedded in the display device 560 (e.g., a display).

The processor 520 may execute, for example, software (e.g., a program 540) to control at least one other component (e.g., a hardware or a software component) of the electronic device 501 coupled with the processor 520, and may perform various data processing or computations. As at least part of the data processing or computations, the processor 520 may load a command or data received from another component (e.g., the sensor module 576 or the communication module 590) in volatile memory 532, process the command or the data stored in the volatile memory 532, and store resulting data in non-volatile memory 534. The processor 520 may include a main processor 521 (e.g., a central processing unit (CPU) or an application processor (AP)), and an auxiliary processor 523 (e.g., a graphics processing unit (GPU), an image signal processor (ISP), a sensor hub processor, or a communication processor (CP)) that is operable independently from, or in conjunction with, the main processor 521. Additionally or alternatively, the auxiliary processor 523 may be adapted to consume less power than the main processor 521, or execute a particular function. The auxiliary processor 523 may be implemented as being separate from, or a part of, the main processor 521.

The auxiliary processor 523 may control at least some of the functions or states related to at least one component (e.g., the display device 560, the sensor module 576, or the communication module 590) among the components of the electronic device 501, instead of the main processor 521 while the main processor 521 is in an inactive (e.g., sleep) state, or together with the main processor 521 while the main processor 521 is in an active state (e.g., executing an application). According to one embodiment, the auxiliary processor 523 (e.g., an ISP or a CP) may be implemented as part of another component (e.g., the camera module 580 or the communication module 590) functionally related to the auxiliary processor 523.

The memory 530 may store various data used by at least one component (e.g., the processor 520 or the sensor module 576) of the electronic device 501. The various data may include, for example, software (e.g., the program 540) and input data or output data for a command related thereto. The memory 530 may include the volatile memory 532 or the non-volatile memory 534.

The program 540 may be stored in the memory 530 as software, and may include, for example, an operating system (OS) 542, middleware 544, or an application 546.

The input device 550 may receive a command or data to be used by other component (e.g., the processor 520) of the electronic device 501, from the outside (e.g., a user) of the electronic device 501. The input device 550 may include, for example, a microphone, a mouse, or a keyboard.

The sound output device 555 may output sound signals to the outside of the electronic device 501. The sound output device 555 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 560 may visually provide information to the outside (e.g., a user) of the electronic device 501. The display device 560 may include, for example, a display, a hologram device, or a projector and control circuitry to control a corresponding one of the display, hologram device, and projector. According to one embodiment, the display device 560 may include touch circuitry adapted to detect a touch, or sensor circuitry (e.g., a pressure sensor) adapted to measure the intensity of force incurred by the touch.

The audio module 570 may convert a sound into an electrical signal and vice versa. According to one embodiment, the audio module 570 may obtain the sound via the input device 550, or output the sound via the sound output device 555 or a headphone of an external electronic device 502 directly (e.g., wired) or wirelessly coupled with the electronic device 501.

The sensor module 576 may detect an operational state (e.g., power or temperature) of the electronic device 501 or an environmental state (e.g., a state of a user) external to the electronic device 501, and then generate an electrical signal or data value corresponding to the detected state. The sensor module 576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 577 may support one or more specified protocols to be used for the electronic device 501 to be coupled with the external electronic device 502 directly (e.g., wired) or wirelessly. According to one embodiment, the interface 577 may include, for example, a high definition multimedia interface (HDMI), a universal serial bus (USB) interface, a secure digital (SD) card interface, or an audio interface.

A connecting terminal 578 may include a connector via which the electronic device 501 may be physically connected with the external electronic device 502. According to one embodiment, the connecting terminal 578 may include, for example, an HDMI connector, a USB connector, an SD card connector, or an audio connector (e.g., a headphone connector).

The haptic module 579 may convert an electrical signal into a mechanical stimulus (e.g., a vibration or a movement) or an electrical stimulus which may be recognized by a user via tactile sensation or kinesthetic sensation. According to one embodiment, the haptic module 579 may include, for example, a motor, a piezoelectric element, or an electrical stimulator.

The camera module 580 may capture a still image or moving images. According to one embodiment, the camera module 580 may include one or more lenses, image sensors, ISPs, or flashes.

The power management module 588 may manage power supplied to the electronic device 501. The power management module 588 may be implemented as at least part of, for example, a power management integrated circuit (PMIC).

The battery 589 may supply power to at least one component of the electronic device 501. According to one embodiment, the battery 589 may include, for example, a primary cell which is not rechargeable, a secondary cell which is rechargeable, or a fuel cell.

The communication module 590 may support establishing a direct (e.g., wired) communication channel or a wireless communication channel between the electronic device 501 and the external electronic device (e.g., the electronic device 502, the electronic device 504, or the server 508) and performing communication via the established communication channel. The communication module 590 may include one or more communication processors that are operable independently from the processor 520 (e.g., the AP) and supports a direct (e.g., wired) communication or a wireless communication. According to one embodiment, the communication module 590 may include a wireless communication module 592 (e.g., a cellular communication module, a short-range wireless communication module, or a global navigation satellite system (GNSS) communication module) or a wired communication module 594 (e.g., a local area network (LAN) communication module or a power line communication (PLC) module). A corresponding one of these communication modules may communicate with the external electronic device via the first network 598 (e.g., a short-range communication network, such as Bluetooth™, wireless-fidelity (Wi-Fi) direct, or a standard of the Infrared Data Association (IrDA)) or the second network 599 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 592 may identify and authenticate the electronic device 501 in a communication network, such as the first network 598 or the second network 599, using subscriber information (e.g., international mobile subscriber identity (IMSI)) stored in the subscriber identification module 596.

The antenna module 597 may transmit or receive a signal or power to or from the outside (e.g., the external electronic device) of the electronic device 501. According to one embodiment, the antenna module 597 may include one or more antennas, and, therefrom, at least one antenna appropriate for a communication scheme used in the communication network, such as the first network 598 or the second network 599, may be selected, for example, by the communication module 590 (e.g., the wireless communication module 592). The signal or the power may then be transmitted or received between the communication module 590 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 501 and the external electronic device 504 via the server 508 coupled with the second network 599. Each of the electronic devices 502 and 504 may be a device of a same type as, or a different type, from the electronic device 501. All or some of operations to be executed at the electronic device 501 may be executed at one or more of the external electronic devices 502, 504, or 508. For example, if the electronic device 501 should perform a function or a service automatically, or in response to a request from a user or another device, the electronic device 501, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 501. The electronic device 501 may provide the outcome, with or without further processing of the outcome, as at least part of a reply to the request. To that end, a cloud computing, distributed computing, or client-server computing technology may be used, for example.

One embodiment may be implemented as software (e.g., the program 540) including one or more instructions that are stored in a storage medium (e.g., internal memory 536 or external memory 538) that is readable by a machine (e.g., the electronic device 501). For example, a processor of the electronic device 501 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method comprising:
   receiving an input including a measurement output of digital channel information, the digital channel information comprising an estimated digital channel, a beamforming codebook, and quantized angle of arrival (AoA) values;
   selecting a basis from a set of bases according to a largest projection power of the measurement output onto the set of bases, wherein each basis in the set of bases corresponds to a respective one of the quantized AoA values;
   recovering a partial channel based on the beamforming codebook and the estimated digital channel; and recovering an analog channel based on the partial channel and the basis.

2. The method of claim 1, wherein selecting the basis comprises:
   determining the set of bases; and
   parameterizing each basis in the set of bases by a corresponding quantized AoA value.

3. The method of claim 2, wherein the basis is selected based on the beamforming codebook and the estimated digital channel.

4. The method of claim 1, wherein recovering the analog channel is performed utilizing a partial identity codebook or a uniform discrete Fourier transform (DFT) codebook.

5. A system comprising:
   a memory; and
   a processor configured to:
   receive an input including a measurement output of digital channel information, the digital channel information comprising an estimated digital channel, a beamforming codebook, and quantized angle of arrival (AoA) values;
   select a basis from a set of bases according to a largest projection power of the measurement output onto the set of bases, wherein each basis in the set of bases corresponds to a respective one of the quantized AoA values;
   recover a partial channel based on the beamforming codebook and the estimated digital channel; and
   recover an analog channel based on the partial channel and the basis.

6. The system of claim 5, wherein, in selecting the basis, the processor is further configured to:
   determine the set of bases; and
   parameterize each basis in the set of bases by a corresponding quantized AoA value.

7. The system of claim 6, wherein the basis is selected based on the beamforming codebook and the estimated digital channel.

8. The system of claim 5, wherein recovering the analog channel is performed utilizing a partial identity codebook or a uniform discrete Fourier transform (DFT) codebook.

9. A non-transitory computer readable storage medium storing instructions that, when executed, cause a processor to:
   receive an input including a measurement output of digital channel information, the digital channel information comprising an estimated digital channel, a beamforming codebook, and quantized angle of arrival (AoA) values;
   select a basis from a set of bases according to a largest projection power of the measurement output onto the set of bases, wherein each basis in the set of bases corresponds to a respective one of the quantized AoA values;
   recover a partial channel based on the beamforming codebook and the estimated digital channel; and
   recover an analog channel based on the partial channel and the basis.

10. The non-transitory computer readable storage medium of claim 9, wherein, in selecting the basis, the instructions further cause the processor to:
    determine the set of bases; and
    parameterize each basis in the set of bases by a corresponding quantized AoA value.

11. The non-transitory computer readable storage medium of claim 10, wherein the basis is selected based on the beamforming codebook and the estimated digital channel.

12. The non-transitory computer readable storage medium of claim 9, wherein recovering the analog channel is performed utilizing a partial identity codebook or a uniform discrete Fourier transform (DFT) codebook.

* * * * *